United States Patent
Croutwater et al.

(10) Patent No.: US 11,188,720 B2
(45) Date of Patent: Nov. 30, 2021

(54) COMPUTING SYSTEM INCLUDING VIRTUAL AGENT BOT PROVIDING SEMANTIC TOPIC MODEL-BASED RESPONSE

(71) Applicant: International Business Machines Corporation, Armonk, NY (US)

(72) Inventors: Kyle Croutwater, Chapel Hill, NC (US); Le Zhang, Cary, NC (US); Vikrant Verma, Raleigh, NC (US); Zhe Zhang, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 16/515,318

(22) Filed: Jul. 18, 2019

(65) Prior Publication Data
US 2021/0019375 A1   Jan. 21, 2021

(51) Int. Cl.
*G06F 40/56* (2020.01)
*H04L 12/58* (2006.01)
(Continued)

(52) U.S. Cl.
CPC .......... *G06F 40/56* (2020.01); *G06F 16/3344* (2019.01); *G06F 40/30* (2020.01); *G10L 15/22* (2013.01); *H04L 51/02* (2013.01)

(58) Field of Classification Search
CPC ..... H04L 51/02; G10L 15/22; G10L 15/1815; G06F 40/30; G06F 40/56; G06F 16/3329; G06F 16/3344; G06F 16/90332
See application file for complete search history.

(56) References Cited

U.S. PATENT DOCUMENTS 6,021,428 A * 2/2000 Miloslavsky ....... G06F 11/1008
                                                      348/E7.082
6,104,989 A * 8/2000 Kanevsky ............. G06F 40/216
                                                      704/9

(Continued)

FOREIGN PATENT DOCUMENTS

WO   2018018626 A1   2/2018
WO   2018071594 A1   4/2018
WO   2018227462 A1   12/2018

OTHER PUBLICATIONS

C. Horan, "Using NLP to Automate Customer Support, Part Two," [url: https://blog.floydhub.com/automate-customer-support-part-two/], Jan. 17, 2019 (25 pages).

(Continued)

*Primary Examiner* — Eric Yen
(74) *Attorney, Agent, or Firm* — Cantor Colburn LLP; Will Stock

(57) ABSTRACT

A computer-implemented method of executing a virtual agent bot includes receiving, via a computer server, at least one input query from a user, and analyzing the at least one input query to extract at least one input term. The method further comprises determining a semantic skill set of the virtual agent bot among a plurality of different candidate skill sets based at least in part on the at least one input term; and invoking the virtual agent bot to provide a semantic topic response corresponding to the semantic skill set to provide an answer to the at least one input query.

17 Claims, 9 Drawing Sheets

(51) Int. Cl.
*G06F 40/30* (2020.01)
*G06F 16/33* (2019.01)
*G10L 15/22* (2006.01)

(56) References Cited

U.S. PATENT DOCUMENTS

| | | | | |
|---|---|---|---|---|
| 7,398,209 | B2* | 7/2008 | Kennewick | G10L 15/1822 |
| | | | | 704/255 |
| 8,594,845 | B1* | 11/2013 | Gharpure | G10L 15/22 |
| | | | | 700/253 |
| 9,406,077 | B1* | 8/2016 | Zhao | G06Q 30/0242 |
| 9,836,461 | B1* | 12/2017 | Mishne | G06F 16/93 |
| 9,848,082 | B1* | 12/2017 | Lillard | H04M 3/5231 |
| 10,102,844 | B1* | 10/2018 | Mois | G06F 16/3329 |
| 10,146,751 | B1* | 12/2018 | Zhang | G06F 16/313 |
| 10,750,019 | B1* | 8/2020 | Petrovykh | H04L 51/02 |
| 2002/0120436 | A1* | 8/2002 | Mizutani | G10L 15/005 |
| | | | | 704/2 |
| 2003/0182124 | A1* | 9/2003 | Khan | G10L 15/22 |
| | | | | 704/270.1 |
| 2004/0006628 | A1* | 1/2004 | Shepard | H04L 69/329 |
| | | | | 709/228 |
| 2004/0044516 | A1* | 3/2004 | Kennewick | G10L 15/22 |
| | | | | 704/5 |
| 2008/0270359 | A1* | 10/2008 | Madhavan | G06F 16/951 |
| 2009/0063470 | A1* | 3/2009 | Peled | G06F 40/295 |
| 2009/0313343 | A1* | 12/2009 | Brady | G06F 40/30 |
| | | | | 709/206 |
| 2010/0114580 | A1* | 5/2010 | McClendon | G10L 21/00 |
| | | | | 704/275 |
| 2010/0226490 | A1* | 9/2010 | Schultz | H04M 3/523 |
| | | | | 379/265.09 |
| 2013/0018895 | A1* | 1/2013 | Harless | G10L 15/1822 |
| | | | | 707/748 |
| 2013/0117677 | A1* | 5/2013 | St. Jacques, Jr. | G06F 16/9535 |
| | | | | 715/738 |
| 2013/0254209 | A1* | 9/2013 | Kang | G06F 16/2228 |
| | | | | 707/741 |
| 2013/0332172 | A1* | 12/2013 | Prakash | H04M 1/72412 |
| | | | | 704/270.1 |
| 2014/0006461 | A1* | 1/2014 | Estes | G06F 40/194 |
| | | | | 707/821 |
| 2014/0172419 | A1* | 6/2014 | John | G06F 16/685 |
| | | | | 704/201 |
| 2014/0379334 | A1* | 12/2014 | Fry | G10L 15/22 |
| | | | | 704/235 |
| 2015/0066895 | A1* | 3/2015 | Komissarchik | G06F 16/5846 |
| | | | | 707/709 |
| 2015/0348548 | A1* | 12/2015 | Piernot | H04W 4/025 |
| | | | | 704/235 |
| 2016/0070696 | A1* | 3/2016 | Lavallee | G10L 15/00 |
| | | | | 704/9 |
| 2016/0314398 | A1* | 10/2016 | Fei | G06Q 50/01 |
| 2017/0124184 | A1* | 5/2017 | Podgorny | G06F 16/3322 |
| 2017/0186425 | A1* | 6/2017 | Dawes | G10L 15/222 |
| 2017/0193095 | A1* | 7/2017 | Ben-Tzur | G06F 40/253 |
| 2017/0228361 | A1 | 8/2017 | Zhang et al. | |
| 2017/0295114 | A1* | 10/2017 | Goldberg | G06N 20/00 |
| 2018/0053119 | A1* | 2/2018 | Zeng | G06F 40/295 |
| 2018/0157637 | A1* | 6/2018 | Grant | H04L 51/32 |
| 2018/0157681 | A1* | 6/2018 | Yang | G06F 16/583 |
| 2019/0087397 | A1* | 3/2019 | Li | G06F 16/35 |
| 2019/0103111 | A1* | 4/2019 | Tiwari | G06F 16/3334 |
| 2019/0108450 | A1* | 4/2019 | Byron | G06F 40/247 |
| 2019/0243669 | A1* | 8/2019 | Gupta | G10L 15/26 |
| 2019/0295551 | A1* | 9/2019 | White | G06F 16/3329 |
| 2019/0355363 | A1* | 11/2019 | Nelson | G06F 9/44505 |
| 2019/0371295 | A1* | 12/2019 | He | G10L 15/063 |
| 2020/0005335 | A1* | 1/2020 | Wang | G06F 16/24578 |
| 2020/0097616 | A1* | 3/2020 | Asur | G06F 16/3329 |
| 2020/0184959 | A1* | 6/2020 | Yasa | G10L 15/1815 |

OTHER PUBLICATIONS

G. Wiese, "Enhancing Intent Classification with the Universal Sentence Encoder," [url: https://medium.com/scalableminds/enhancing-intent-classification-with-the-universal-sentence-encoder-ecbcd7a3005c], Aug. 1, 2018 (4 pages).

IBM, "Personalized chatbot service," IP.com Disclosure No. IPCOM000181584D, Apr. 6, 2009 (7 pages).

P. Wenig, "Creation of Sentence Embeddings Based on Topical Word Representations," Master's Thesis, University of Liechtenstein, Nov. 2018 (76 pages).

Wu et al., "Topic Augmented Neural Network for Short Text Conversation," [url: https://arxiv.org/abs/1605.00090v1], Apr. 30, 2016 (10 pages).

Yan et al., "DocChat: An Information Retrieval Approach for Chatbot Engines Using Unstructured Documents." Proceedings of the 54th Annual Meeting of the Association for Computational Linguistics, pp. 516-525, Berlin, Germany, Aug. 7-12, 2016.

* cited by examiner

Q1: What boots are in style this winter? (Shopping)

| Skills (s) | Intents (i) | Topic Score (TS) | Highest Sentence Similarity Score (SS) | Topic Score – With Context | Highest Sentence Similarity Score – With Context | Final Score S(best) |
|---|---|---|---|---|---|---|
| Weather | temperature | 0.8 | 0.5 | | | 0.8 + 0.5 = 1.3 |
|  | alerts | 0.3 | 0.2 | | | |
|  | road conditions | 0.4 | 0.4 | | | |
|  | traffic | 0.2 | 0.1 | | | |
| Shopping | style | 0.9 | 0.9 | | | 0.9 + 0.9 = 1.8 |
|  | product details | 0.6 | 0.4 | | | |
|  | notifications | 0.2 | 0.3 | | | |
|  | recommendations | 0.8 | 0.7 | | | |
| Music | genre | 0.2 | NA | NA | NA | NA |
|  | notifications | 0.2 | NA | | | |
|  | recommendations | 0.3 | NA | | | |

408 — (TS, SS columns); 410 — Final Score

FIG. 5A q1: What boots are in style this winter? (Shopping)
q2: What do you recommend?

| Skills (s) | Intents (i) | Topic Score (TS) | Highest Sentence Similarity Score (SS) | Topic Score – With Context | Highest Sentence Similarity Score – With Context | Final Score S(best) |
|---|---|---|---|---|---|---|
| Weather | temperature | 0.1 | NA | 0.6 | NA | NA |
|  | alerts | 0.3 | NA | 0.3 | NA |  |
|  | road conditions | 0.1 | NA | 0.5 | NA |  |
|  | traffic | 0.1 | 0.2 | 0.1 | 0.3 |  |
| Shopping | style | 0.4 | 0.3 | 0.8 | 0.8 |  |
|  | product details | 0.3 | 0.3 | 0.6 | 0.4 |  |
|  | notifications | 0.3 | 0.1 | 0.2 | 0.3 |  |
|  | recommendations | 0.9 | 0.7 | 0.9 | 0.9 | 0.9 + 0.9 = 1.8 |
| Music | genre | 0.6 | 0.2 | 0.1 | 0.1 |  |
|  | notifications | 0.3 | 0.1 | 0.1 | 0.2 |  |
|  | recommendations | 0.9 | 0.8 | 0.7 | 0.8 | 0.9 + 0.8 = 1.7 |

COMPUTING SYSTEM INCLUDING VIRTUAL AGENT BOT PROVIDING SEMANTIC TOPIC MODEL-BASED RESPONSE

BACKGROUND

The present invention generally relates to a computing system, and more specifically to a virtual agent bot configured to interact with a user.

Computing systems often implement agent bots (also known as a chatbot, talkbot, chatterbot, Bot, IM bot, interactive agent, or Artificial Conversational Entity), which are provided using a computer processor that executes a computer program to facilitate a virtual conversation with a user via auditory and/or textual methods. Agent bots are typically used in dialog systems for various practical purposes including customer service, information acquisition and/or consumer sales transactions. Known agent bots typically utilize sophisticated natural language processing systems to determine a user's auditory and/or textual input question, and then automatically provides the user with a related answer.

SUMMARY

Embodiments of the present invention are directed to a computer-implemented method of executing a virtual agent. A non-limiting example of the computer-implemented method includes receiving, via a computer server, at least one input query from a user, and analyzing the at least one input query to extract at least one input term. The method further comprises determining a semantic skill set of the virtual agent bot among a plurality of different candidate skill sets based at least in part on the at least one input term; and invoking the virtual agent bot to provide a semantic topic response corresponding to the semantic skill set to provide an answer to the at least one input query.

Embodiments of the present invention are directed to a system configured to execute a virtual agent bot. A non-limiting example of the system includes a storage medium, the storage medium being coupled to a processor. The processor is configured to receive at least one input query from a user, and analyze the at least one input query to extract at least one input term. The processor is further configured to determine a semantic skill set of the virtual agent bot among a plurality of different candidate skill sets based at least in part on the at least one input term; and invoke the virtual agent bot to provide a semantic topic response corresponding to the semantic skill set to provide an answer to the at least one input query.

Embodiments of the invention are directed to a computer program product configured to execute a virtual agent bot, the computer program product comprising a computer-readable storage medium having program instructions embodied therewith, the program instructions executable by a processor to cause the processor to receive at least one input query from a user, and analyze the at least one input query to extract at least one input term. The processor is further configured to determine a semantic skill set of the virtual agent bot among a plurality of different candidate skill sets based at least in part on the at least one input term; and invoke the virtual agent bot to provide a semantic topic response corresponding to the semantic skill set to provide an answer to the at least one input query.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5A depicts an assignment of semantic scores resulting from a semantic analysis performed by the system shown in FIG. 4 according to a non-limiting embodiment;

FIG. 5B depicts an assignment of semantic scores resulting from a semantic analysis performed by the system shown in FIG. 4 according to a non-limiting embodiment;

Figure 1:
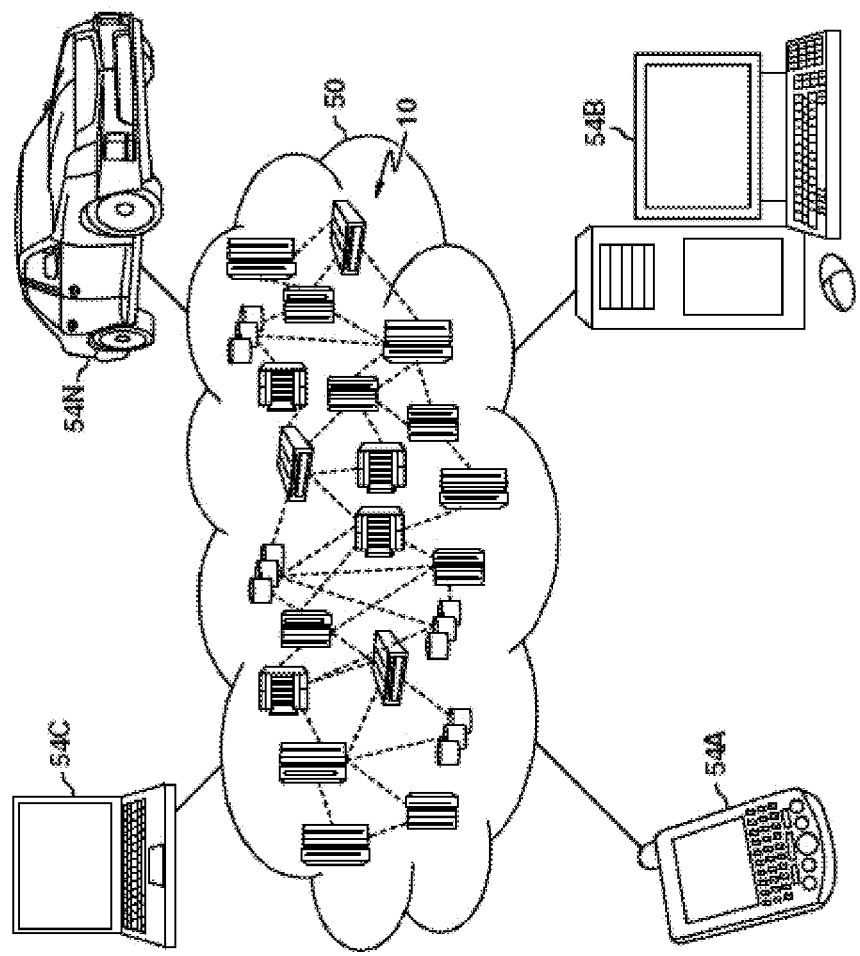
FIG. 1 depicts a cloud computing environment according to one or more non-limiting embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Turning now to an overview of technologies that are more specifically relevant to aspects of the invention, known agent bots are capable of providing automated responses to a user input. These known agent bots, however, are typically limited to a single skill set, which is pre-stored in the memory of the computing system. Moreover, the pre-stored skill set is input as static information that must be manually updated over a continuous period in order to maintain the reliability of the agent bot.

One or more embodiments of the invention address the above-described shortcomings of the prior art by providing a computing system that includes a virtual agent bot capable of providing a semantic topic model-based response to a user input. Unlike known chat bots, the virtual agent bot described herein is trained according to a plurality of different skill sets as opposed to being limited to only a single skill set. In this manner, the system can invoke and execute the virtual agent bot to perform a semantic analysis based at least in part on the input query and the different trained skill sets, and provide the user with a substantially relevant and logically related (i.e., semantic) response to the user's input query.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
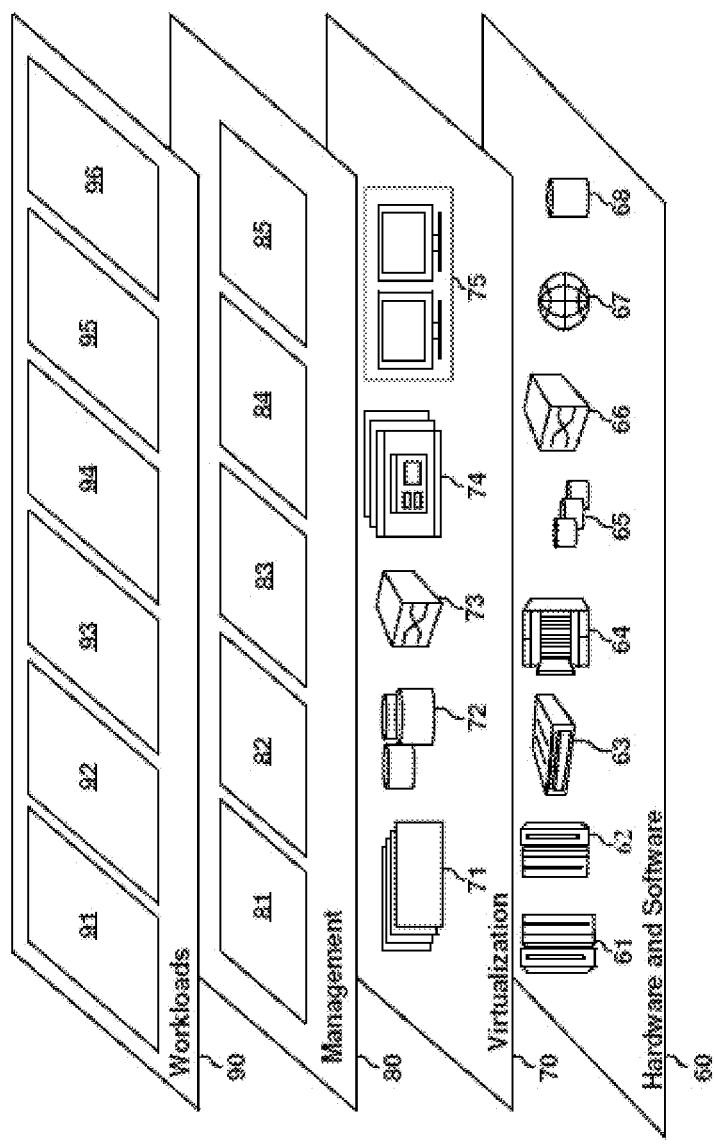
FIG. 2 depicts abstraction model layers according to one or more non-limiting embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Turning now to an overview of technologies that are more specifically relevant to aspects of the invention, social media platforms and networks allow users to create user profiles and interact with other users of the social media platform. The user profiles can include a variety of information ranging from the user's interests, posts, pictures, etc. Users can send messages to other users via the social media platform. Because user profiles can be easily created on the social media platforms there may be a need to provide a technique to authenticate a user account and/or provide a warning to a user receiving a message that the user account sending the message may be fraudulent, e.g., the sender may be impersonating another person. In today's environment, it is difficult to identify whether a message from a user profile is valid. Some users may create non-genuine user profiles in an attempt to obtain information from other users or provide malicious code to those unsuspecting users that connect with the users. The non-genuine accounts can include accounts that are questionable, fake, not authorized by a user, or invalid/unauthenticated accounts. These non-genuine accounts can include accounts that have been spoofed, replicated, duplicated, imitated, etc.

Turning now to an overview of the aspects of the invention, one or more embodiments of the invention address the above-described shortcomings of the prior art by providing techniques to detect impersonation attempts by users of a social media platform and provide a notification as to the validity of the messages received by users.

Figure 3:
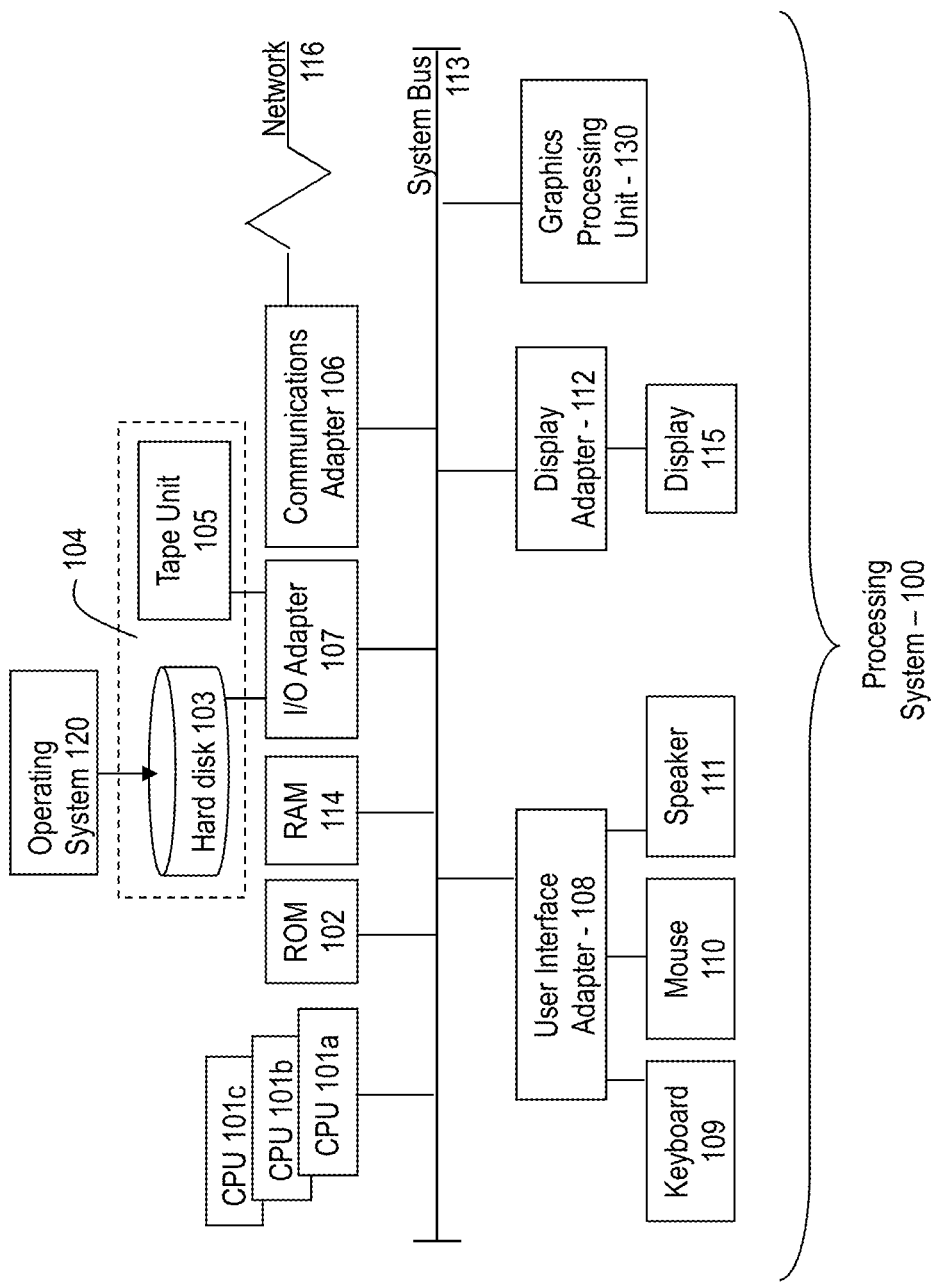
FIG. 3 depicts a block diagram of a computer system for use in practicing the teachings herein according to one or more non-limiting embodiments of the present invention.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
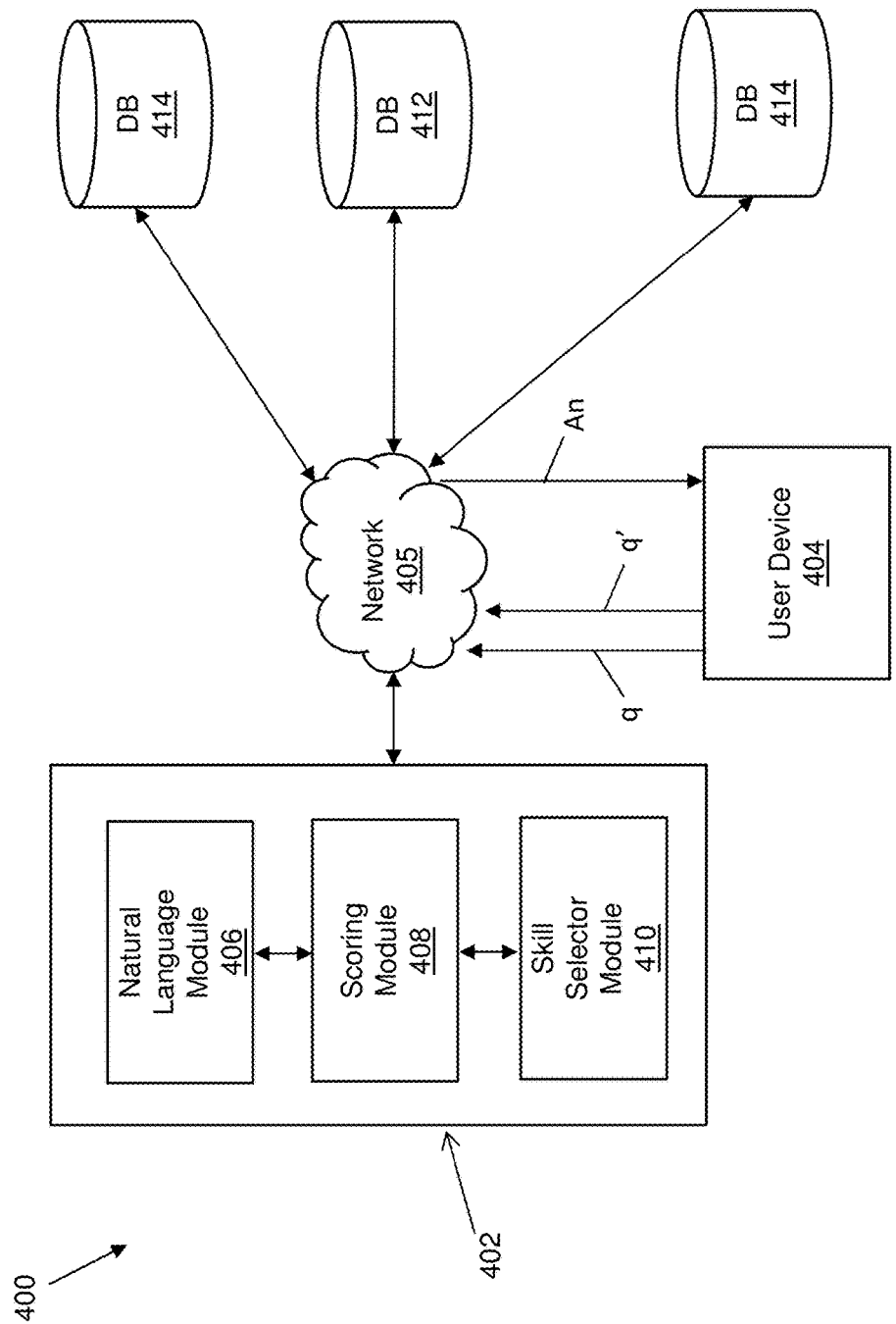
FIG. 4 depicts a block diagram of a computing system configured to operate a virtual agent bot capable of providing a semantic topic model-based response in accordance with one or more non-limiting embodiments of the invention.

Turning now to a more detailed description of aspects of the present invention, FIG. 4 depicts a computing system 400 configured to operate a virtual agent bot capable of providing a semantic topic model-based response in accordance with one or more non-limiting embodiments of the invention. The system 400 includes a server 402 that includes a plurality of hardware/software components for invoking and operating the virtual agent bot. The server 402 may be embodied in a cloud computing system such as the one shown in FIGS. 1 and 2 or in a processing system such as the one shown in FIG. 3.

In exemplary embodiments, the server 402 is configured to receive a conversation context/session (H(u)) and/or an input (q) from a user device 404 via a network 405. In one or more non-limiting embodiments, conversation context/session can be viewed as a chat history. As the conversation is taking place, the server 402 can monitor and save previous inputs (i.e., historical inputs) and previous agent bot semantic topic response (i.e., historical semantic topic responses) to a database. Thereafter, when the new or subsequent user input (q) is received, the server 402 can also consider the previous inputs (q_history) retrieved from the database for a particular conversation session. For example, a user may provide a user input (q1), of which the agent bot sends a response. The user may then provide a subsequent user input (q2), of which the agent bot sends a response and so on. These multiple rounds of user inputs and agent bot responses is referred to as a conversation context/session. In one or more embodiments, the server 402 can compute scores from both scenarios, i.e., scenario-1: consider the initial user input (q1). and scenario-2: consider the initial input (q1) along with user's previous or historical inputs (q_history), for the current ongoing conversation/topic/discussion. In the event that both the input (q) and the conversation context/session (H(u)) are received, the server combines the input (q) and the conversation context/session (H(u)) to generate a contextual input (q').

The server 402 is also in signal communication with one or more databases 412. The databases 412 can be embodied in a cloud computing system such as the one shown in FIGS. 1 and 2 or in a processing system such as the one shown in FIG. 3. The databases 412 can store mathematical transformation libraries, along with various machine learning, deep learning, and neural networking models and algorithms to facilitate numerical computations, large-scale machine learning processes, and predictive analysis. The models and algorithms stored in a database 412 and utilized by the server include, but are not limited to, topic models, neural topic model (NTM) algorithms, similarity learning algorithms, sentence clustering models, and word embedding models. The aforementioned algorithms and models can be executed alone or in combination to perform a semantic-based analysis that determines a relevancy or logical relation of input keywords of an input question with respect to a possible topic or intended topic of the input question.

One or more of the databases can also include a third-party database 414 that permits searching for information and data stored therein. The third-party databases 414 include, but are not limited to, weather databases, consumer sales databases, stock information databases, and search engine databases. In this manner, the server 402 can provide a virtual agent bot trained to have a plurality of skills, and in response to identifying that a user's input questions falls under the topic of a trained skill, the server 402 can search a server 414 that is most closely relevant to the topic of the input question.

The server 402 includes a natural language module 406, a topic score module 408, and a skill selector module 410. Although four modules 406, 408 and 410 are illustrated, it should be understood the server 402 is not limited by the illustrated example. Any one of the natural language module 406, topic score module 408, and skill selector module 410 can be constructed as an electronic hardware controller that includes memory and a processor configured to execute algorithms and computer-readable program instructions stored in the memory. In addition, the natural language module 406, topic score module 408 and skill selector module 410 can all be embedded or integrated in a single controller.

The modules 406, 408 and 410 are configured to process data associated to analyze various categories of information associated with the input question (q) and/or the contextual input (q'). In one or more embodiments, the natural language module 406, topic score module 408 and skill selector module 410 work together to provide a virtual agent bot that generates a semantic topic model-based response to one or more user input questions or inquiries.

The natural language module 406 receives an input question (q) or a contextual input (H(u). with respect to a previous input question (q), which can be referred to as a contextual question/follow up question (q'). In one or more embodiments, the natural language module 406 detects an initial input question (q) at time T1, and identifies one or more following questions received within a time period of the previous question as a contextual input (H(u) containing context information related to the previous input question.

The input question (q) and contextual question (q') includes a user query text content comprising a plurality of different words. The natural language module 406 performs natural language processing (NLP) using various NLP algorithms and models either stored in the server 402 and/or the database 412 to analyze the text content and identify one or more query topics defined by combinations of the text content words. For example, the NLP operations performed by the natural language module 406 can consider and analyze keywords identified in the text content in combination with each other, including as modified by verbs, adverbs, adjectives, subject clauses, etc., associated therewith (via sentence structure conventions). In one or more embodiments, the natural language module 406 can generate word clusters based on the identified keywords. The clusters can then be utilized to determine a topic of the input question (q) or contextual question (q') as described in greater detail below.

The topic score module 408 is configured to compare the identified keywords from the input question (q), and if received the contextual question (q'), to intent data stored in the server 402 and/or database 412. The intent data includes one or more intent keywords (i) that correspond to an intended topic or given intent (i) included in particular skill set (s) of the virtual agent bot. The skills (s) and respective intents (i) are established following the completion of a training session that is performed prior to commencing runtime operation of the virtual agent bot.

In one or more non-limiting embodiments, the topic score module 408 compares the identified keywords received from the natural language module 406 to a plurality of pre-stored intent keywords. The comparison includes performing word embedding operations based on the identified keywords and the pre-stored intent keywords. Word embedding, for example, includes mapping words or phrases from a vocabulary or work library to vectors of real numbers. Conceptually it involves a mathematical embedding from a space with many dimensions per word to a continuous vector space with a much lower dimension. Accordingly, the word embedding operation can be used to determine a topic score for each intent of a given topic.

Turning to FIG. 5A, for example, the server 402 receives an initial input question (q1): "What boots are in style this winter?", and the topic score module 408 compares the keywords from input question (q1) (e.g., boots, style, winter) to keywords associated with the different trained skills of the virtual agent bot, along with the intent keywords (i) for a given trained skill (s) among a plurality of trained candidate skill sets (C) of the virtual agent bot. Comparisons between the keywords and the skill keywords can be referred to as a skill comparison, while comparisons between the keywords and the intent keywords can be referred to as intent comparisons. Accordingly, the topic score module 408 assigns topic scores (TS) and sentence similarity (SS) scores to the intents (i) corresponding to a given skill (s). In one or more embodiments, scores below a predetermined threshold value (e.g., 0.4) can be deemed irrelevant or disqualified, while a predetermined number of highest scores or scores exceeding a predetermined threshold value indicate the skill most relevant for answering the input question (q1). As shown in FIG. 5A, the topic of input question (q1) is most closely related to weather (e.g., 0.8) and shopping (0.8 and 0.9). However, the sentence similarity score further indicates that the input question (q1) is more related to clothing shopping styles (0.9) than shopping recommendations (0.7). Accordingly, the topic score module 408 determines the highest qualified topic score (TS) and highest sentence score (SS) (referenced by the dashed indicator) within each skill set to the skill selector module 410. In this case, the highest qualified topic score (TS) and highest sentence score (SS) from the weather skill set are associated with temperature (0.8 and 0.5), and the highest qualified topic score (TS) and highest sentence score (SS) from the shopping skill set are associated with clothing style (0.9 and 0.9). No scores associated with the music skill set were not selected because the scores were not high enough to qualify.

The skill selector module 410 adds together the highest topic score (TS) and sentence score (SS) from each skill set to generate a final score. The final score having the highest numerical value is utilized by the skill selector module 410 to determine the best skill set for answering the input question (q1). The best skill set (s) for answering the input question (q) can be referred to as the semantic skill set. Accordingly, the virtual agent bot can be executed to provide a semantic topic model-based response to the user's input question (q). As shown in FIG. 5A, for example, the highest topic score (0.8) and highest sentence score (0.5) associated with the temperature intent (i) are added together to generate a final score of 1.3 associated with the weather skill. Similarly, the highest topic score (0.9) and highest sentence score (0.9) associated with the style intent (i) are added together to generate a final score of 1.8 associated with the shopping skill. Because the final score of the shopping skill (1.8) is greater than the final score of the weather skill (1.3), the skill selector module 410 determines that the shopping skill is best suited to answer the initial input question (q1), i.e., "What boots are in style this winter?" Accordingly, the server 402 can invoke a virtual agent bot to search one or more consumer product or shopping databases 415 and deliver an answer (An) to the user device 404 thereby providing the user with a semantic topic-based response to the input question (q). The answer can include, for example, a plurality of different types of boots, colors of boots and boot brands that are expected to be in demand by consumers for the upcoming winter clothing season.

Turning to FIG. 5B, a user submits a second input question (q2): "What do you recommend?". In one or more embodiments, the topic score module 408 determines that the second input question (q2) is related to the initial input question (q1) based on a duration of time at which the second the second input question (q2) was received following the first input question (q1). For example, the topic score module 408 may determine that the second input question (q2) is related to the initial input question (q1) when the second input question (q2) is received within a time period threshold (e.g., 30 seconds). When, however, a subsequent input question (qn) is received outside of the time threshold, the topic score module can determine that the subsequent input question corresponds to a new topic or is unrelated to the skill set (s) of the initial input question (q1). In this example, the second input question (q2) includes a keyword of "recommend" which matches the "recommendations" intent keywords (i) corresponding to both the "shopping" skill set and the "music" skill set. Accordingly, the topic score module 408 determines the highest qualified topic score (TS) and highest sentence score (SS) (referenced by the dashed indicator) within each skill set to the skill selector module 410.

With respect to the second input question, the highest qualified topic score (TS) and highest sentence score (SS) from the shopping skill set are associated with recommendations (0.9 and 0.9), and the highest qualified topic score (TS) and highest sentence score (SS) from the music skill set are also associated with recommendations (0.7 and 0.8). Because the "weather" skill set excludes a "recommendations" intent keyword (i), the "weather" skill set is ultimately disqualified. In addition, the shopping skill set can be assigned higher scores than the music skill set because the second input question was determined more related to the initial input question, i.e., more related to clothing styles compared to music.

As described above, the skill selector module 410 adds together the highest topic score (TS) and sentence score (SS) from each skill set to generate a final score. In this example, the final score of the shopping skill (1.8) is greater than the final score of the music skill (1.7). Accordingly, the skill selector module 410 determines that the shopping skill is best suited to answer the second input question (q1), i.e., "What do you recommend?" Accordingly, the server 402 can invoke the virtual agent bot to search one or more consumer product or shopping databases 415 and deliver an answer (An) to the user device 404. The answer can include, for example, a particular style, color and or brand of boot, along with vendor information that directs the user where to purchase the recommended boot.

It should be understood that FIGS. 5A and 5B describe only one example. The server 402 can include additional processing modules that can be configured to perform further analysis on other categories of information available in the social network. It should also be understood that any combination or a different combination of categories can be analyzed in the embodiments of the invention. For example, the server can be trained to provide a virtual agent bot that is proficient in analyzing a variety of different skill sets (s) and corresponding intents (i).

Figure 6:
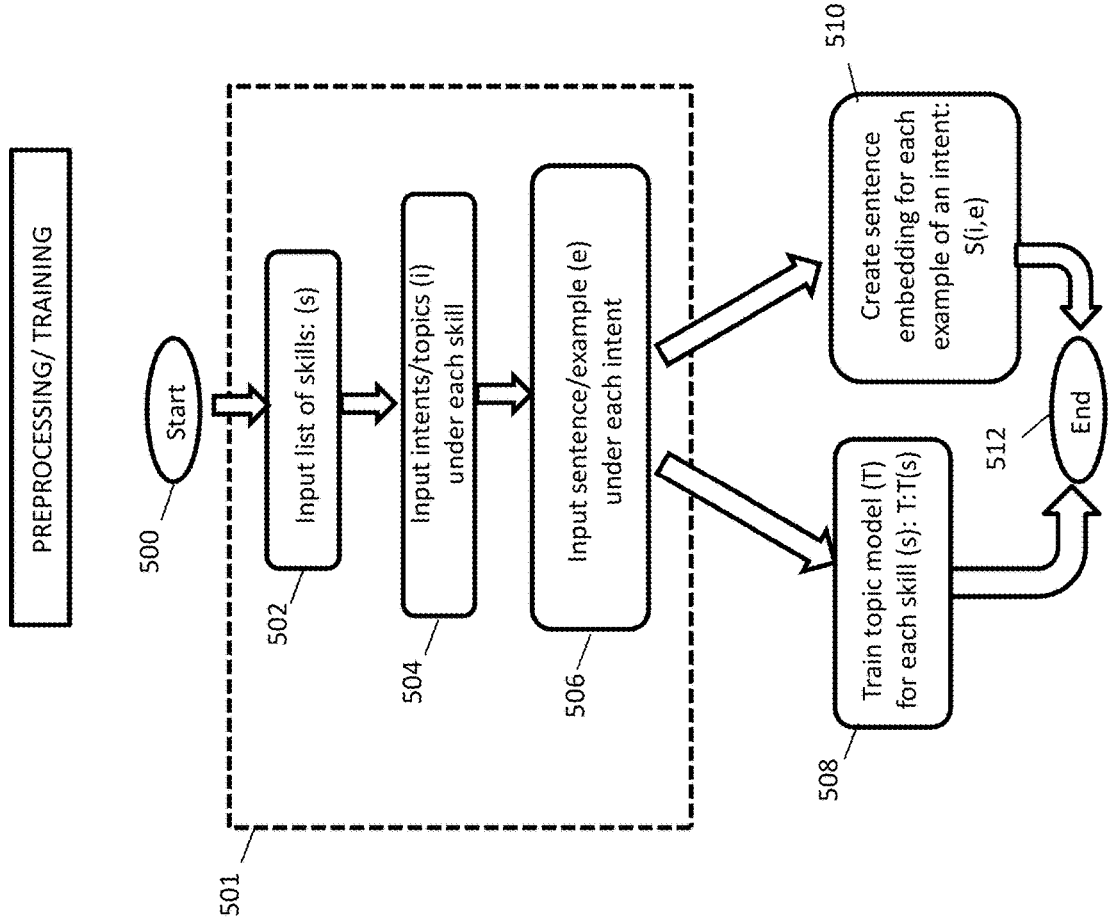
FIG. 6 depicts a flowchart of a method of training a system to provide a virtual agent bot capable of providing a semantic topic model-based response in accordance with one or more non-limiting embodiments of the invention.

FIG. 6 illustrates a method of training a system to provide a virtual agent bot capable of providing a semantic topic model-based response in accordance with one or more non-limiting embodiments of the invention. The method begins at operation 500, and a desired aptitude of the agent bot to be installed in the system is established at operation 501. Establishing the aptitude of the agent bot includes programming into the system a list of candidate skills (s) for analysis by the agent bot at operation 502, programming one or more intents or topics (i) corresponding to each candidate skill at operation 504, and programming one or more sentences/examples (e) corresponding to each intent/topic at operation 506. At operation 508, a topic model (T) for each programmed skill (s) is trained. At operation 510, sentence embedding (S(i,e)) is created for each example (e) of a corresponding intent (i), and the method ends at operation 512. In one or more embodiments, the sentence embedding can be performed while training the topic model.

Figure 7A:
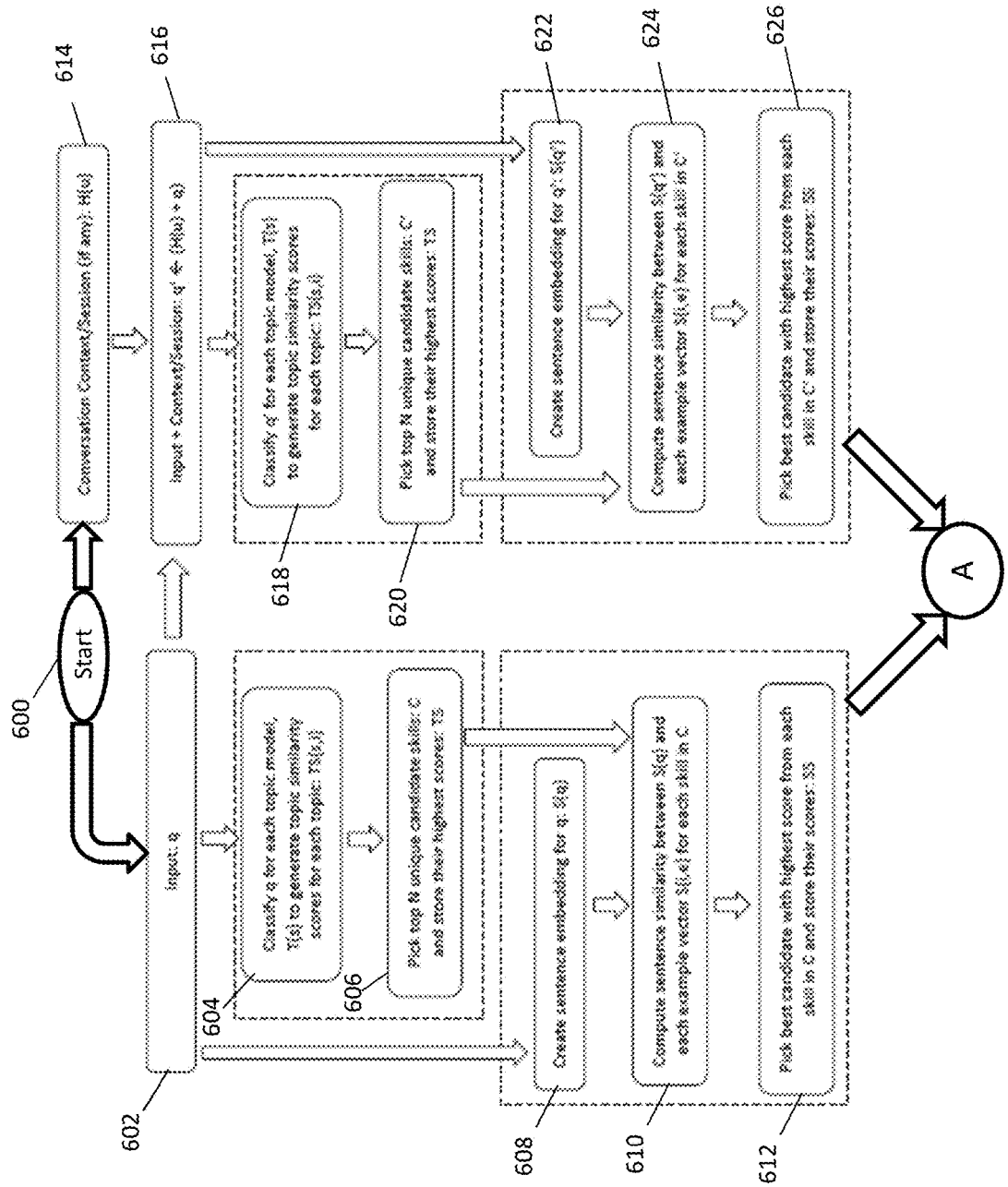
FIGS. 7A and 7B depict a flowchart of a method of operating a virtual agent bot capable of providing a semantic topic model-based response in accordance with one or more non-limiting embodiments of the invention.
Figure 7B:
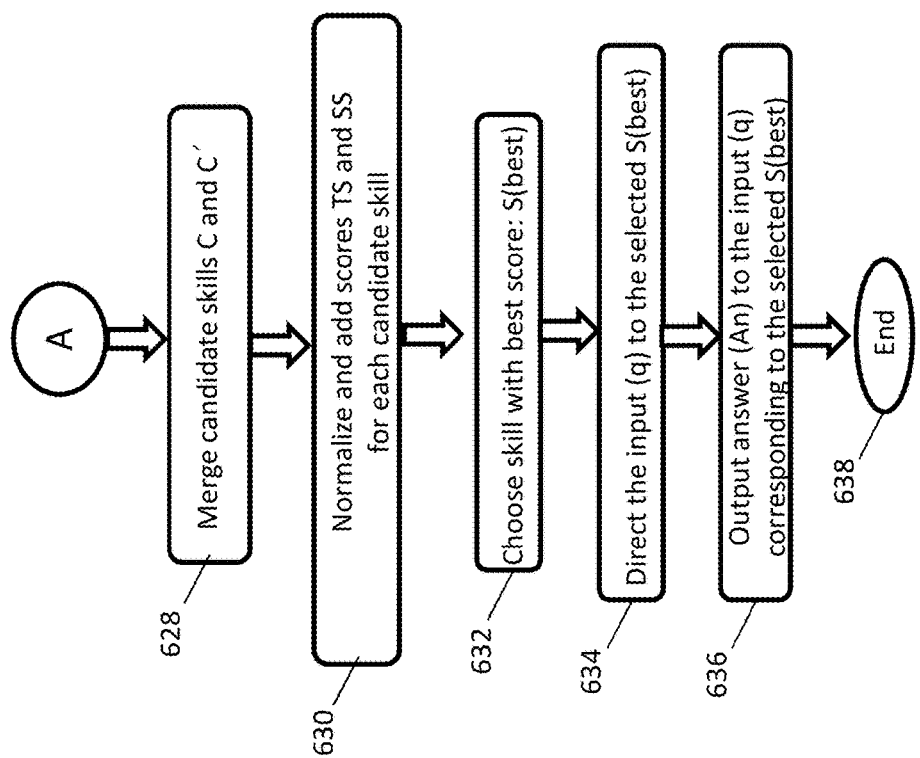

FIGS. 7A and 7B depict a flowchart of a method of operating a virtual agent bot capable of providing a semantic topic model-based response in accordance with one or more non-limiting embodiments of the invention. The method begins at operation 602 and proceeds to operation 602 when an input (q) is received, or proceeds to operation 604 when a conversation context/session is detected.

When receiving an input (q), the system proceeds to operation 604 and classifies the input (q) for each topic model (T(s)) to generate respective topic similarity scores (TS) for each topic. At operation 606, the system selects the top (N) unique candidate skill set (C) and stores their highest scores (TS). At operation 608, sentence embedding (S(q)) is created for the input (q). In one or more embodiments, the sentence embedding (S(q)) is performed while classifying the input (q) and electing the top unique skill set (C) at operations 604 and 606, respectively. At operation 610, sentence similarity between the embedded sentence (S(q)) and each example vector (S(i,e)) for each skill included in the candidate skill set (C) with respect to the input (q). In one or more embodiments, the sentence similarity can be determined while creating the sentence embedding at operation 608. At operation 612, the candidate with the highest score among each skill set is selected as the best candidate. In one or more embodiments, the scores of the candidates are stored in memory for future analysis.

In some scenarios, the system receives a context/session (H(u)) at operation 614. In these instances, the input (q) received at operation 602 is combined with the context/session to generate a combined input (q') at operation 616. The combined input (q') can be expressed as (q+H(u)=>q'), and can be viewed as a contextual question or follow up question (q') related to the previous input question (q). At operation 618, the system classifies the combined input (q') for each topic model (T(s)) to generate respective topic similarity scores (TS) for each topic. At operation 620, the system selects the top (N) unique candidate skill set (C') with respect to the contextual input (q') and stores their highest scores (TS). At operation 622, sentence embedding (S(q')) is created for the contextual input (q'). In one or more embodiments, the sentence embedding is performed while classifying the contextual input (q') and electing the top unique skill set (C') at operations 618 and 620, respectively. At operation 624, sentence similarity between the embedded sentence (S(q')) and each example vector (S(i,e)) for each skill included in the candidate skill set (C') is computed with respect to the contextual input (q'). In one or more embodiments, the sentence similarity can be determined while creating the sentence embedding at operation 622. At operation 626, the candidate with the highest score among each skill set (C') is selected as the best candidate. In one or more embodiments, the scores of the candidates are stored in memory for future analysis.

Turning now to operation 628, the candidate skills (C) corresponding to the input (q) and the candidate skills (C') corresponding to the contextual input (q') are combined. When no contextual input (q') is detected by the system, the combination operation performed at operation 628 may be omitted. At operation 630, the system normalizes and adds together the topic model scores (TS) and the stored scores (SS) for each candidate skill set and the skill with the best score (S(best)) is selected as the best skill at operation 632. At operation 634, the input (q) is directed to the selected best skill, and at operation 636, an answer (An) to the input (q) corresponding to the corresponding selected best skill generated and automatically output. In one or more embodiments, the answer (An) can be output to the user device. Following the output of the answer (An), the method can end at operation 638 or can repeat the operations described above in response to receiving another context/session (H(u)) and/or input (q).

As described herein, various non-limiting embodiments provide a system that invokes and executes a virtual agent bot trained according to a plurality of different skill set as opposed to being limited to a single skill set. the virtual agent bot described herein is capable of providing a semantic topic response corresponding to a semantic skill set to provide an answer that is substantially related and logically relevant (i.e., semantic) to a user's input query.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of executing a virtual agent bot, the computer-implemented method comprising:
receiving, via a computer server, at least one input query from a user;

analyzing the at least one input query to extract at least one input keyword;
determining a semantic skill set of the virtual agent bot among a plurality of different candidate skill sets based at least in part on the at least one input keyword; and
invoking the virtual agent bot to provide a semantic topic response corresponding to the semantic skill set to provide an answer to the at least one input query,
wherein determining the semantic skill set further comprises:
comparing the at least one input keyword to a plurality of intent keywords, each intent keyword corresponding to an individual skill set among the different candidate skill sets;
determining at least one keyword match between the at least one input keyword and at least one matching intent keyword;
performing a semantic analysis based at least in part on the at least one keyword match and calculating a semantic score based at least in part on the semantic analysis.

2. The computer-implemented method of claim 1, wherein the semantic score indicates a relatedness between the at least one input query and a given candidate skill set.

3. The computer-implemented method of claim 2, wherein the determined semantic skill set includes at least one keyword match having a highest semantic score among a plurality of semantic scores.

4. The computer-implemented method of claim 3, wherein the highest semantic score is calculated in response to adding together an individual first semantic score associated with a first candidate skill set and an individual second semantic score associated with the first candidate skill set.

5. The computer-implemented method of claim 1, wherein performing the semantic analysis further comprises:
performing a first semantic analysis based at least in part on skill comparisons between the at least one input keyword and each candidate skill set;
calculating a first semantic score associated with each skill comparison;
performing a second semantic analysis based at least in part on intent comparisons between the at least one input keyword and each of the plurality of intent keywords; and
calculating a second semantic score associated with at least one of the intent comparisons.

6. The computer-implemented method of claim 1, further comprising:
receiving a first input query and determining a first semantic skill set of the virtual agent bot based at least in part on at least one input keyword of the first input query;
providing, via the virtual agent bot, a first semantic topic response corresponding to a first semantic skill set to provide a first answer to the first input query;
receiving a second input query subsequent to the first input query and determining a second semantic skill set of the virtual agent bot based at least in part on at least one input keyword of the second input query; and
providing, via the virtual agent bot, a second semantic topic response corresponding to a second semantic skill set to provide a second answer to the second input query,
wherein the second semantic skill set is determined based at least in part on a time duration between receiving the first input query and the second input query.

7. The computer-implemented method of claim 6, further comprising determining the first and second input queries correspond to a conversation session such that the second skill set matches the first skill set in response to determining the time duration is below a time duration threshold,
wherein the virtual agent bot provides a subsequent semantic topic response based on the second input query and at least one historical input query and at least one historical semantic topic response.

8. A system configured to execute a virtual agent bot, the system comprising:
a storage medium;
a processor in signal communication with the storage medium and configured to:
receive at least one input query from a user;
analyze the at least one input query to extract at least one input keyword;
determine a semantic skill set of the virtual agent bot among a plurality of different candidate skill sets based at least in part on the at least one input keyword;
invoke the virtual agent bot to provide a semantic topic response corresponding to the semantic skill set to provide an answer to the at least one input query,
compare the at least one input keyword to a plurality of intent keywords, each intent keyword corresponding to an individual skill set among the different candidate skill sets;
determine at least one keyword match between the at least one input keyword and at least one matching intent keyword;
perform a semantic analysis based at least in part on the at least one keyword match and calculate a semantic score based at least in part on the semantic analysis; and
determine the semantic skill set based on the semantic score.

9. The system of claim 8, wherein the semantic score indicates a relatedness between the at least one input query and a given candidate skill set.

10. The system of claim 9, wherein the determined semantic skill set includes at least one keyword match having a highest semantic score among a plurality of semantic scores.

11. The system of claim 10, wherein the processor is further configured to calculate the highest semantic score in response to adding together an individual first semantic score associated with a first candidate skill set and an individual second semantic score associated with the first candidate skill set.

12. The system of claim 8, wherein the processor is further configured to:
perform a first semantic analysis based at least in part on skill comparisons between the at least one input keyword and each candidate skill set;
calculate a first semantic score associated with each skill comparison;
perform a second semantic analysis based at least in part on intent comparisons between the at least one input keyword and each of the plurality of intent keywords; and
calculate a second semantic score associated with at least one of the intent comparisons.

13. The system of claim 8, wherein the processor is further configured to:
receive a first input query and determining a first semantic skill set of the virtual agent bot based at least in part on at least one input keyword of the first input query;

provide, via the virtual agent bot, a first semantic topic response corresponding to a first semantic skill set to provide a first answer to the first input query;

receive a second input query subsequent to the first input query and determining a second semantic skill set of the virtual agent bot based at least in part on at least one input keyword of the second input query; and provide, via the virtual agent bot, a second semantic topic response corresponding to a second semantic skill set to provide a second answer to the second input query, wherein the processor is further configured to determine the second semantic skill set based at least in part on a time duration between receiving the first input query and the second input query.

14. The system method of claim 13, wherein the processor is further configured to: determine the first and second input queries correspond to a conversation session such that the second skill set matches the first skill set in response to determining the time duration is below a time duration threshold, wherein the virtual agent bot is configured to provide a subsequent semantic topic response based on the second input query and at least one historical input query and at least one historical semantic topic response.

15. A computer program product configured to execute a virtual agent bot, the computer program product comprising a computer-readable storage medium having program instructions embodied therewith, the program instructions executable by a processor to cause the processor to:

receive at least one input query from a user;

analyze the at least one input query to extract at least one input keyword;

determine a semantic skill set of the virtual agent bot among a plurality of different candidate skill sets based at least in part on the at least one input keyword;

invoke the virtual agent bot to provide a semantic topic response corresponding to the semantic skill set to provide an answer to the at least one input query;

compare the at least one input keyword to a plurality of intent keywords, each intent keyword corresponding to an individual skill set among the different candidate skill sets;

determine at least one keyword match between the at least one input keyword and at least one matching intent keyword;

perform a semantic analysis based at least in part on the at least one keyword match and calculate a semantic score based at least in part on the semantic analysis; and determine the semantic skill set based on the semantic score.

16. The computer program product of claim 15, wherein the program instructions are further executable by the processor to cause the processor to:

perform a first semantic analysis based at least in part on skill comparisons between the at least one input keyword and each candidate skill set;

calculate a first semantic score associated with each skill comparison;

perform a second semantic analysis based at least in part on intent comparisons between the at least one input keyword and each of the plurality of intent keywords; and calculate a second semantic score associated with at least one of the intent comparisons.

17. The computer program product of claim 15, wherein the program instructions are further executable by the processor to cause the processor to:

receive a first input query and determining a first semantic skill set of the virtual agent bot based at least in part on at least one input keyword of the first input query;

provide, via the virtual agent bot, a first semantic topic response corresponding to a first semantic skill set to provide a first answer to the first input query;

receive a second input query subsequent to the first input query and determining a second semantic skill set of the virtual agent bot based at least in part on at least one input keyword of the second input query; and provide, via the virtual agent bot, a second semantic topic response corresponding to a second semantic skill set to provide a second answer to the second input query, wherein the processor determines the second semantic skill set based at least in part on a time duration between receiving the first input query and the second input query.

* * * * *